United States Patent
Zhou et al.

(10) Patent No.: US 11,130,882 B2
(45) Date of Patent: Sep. 28, 2021

(54) SOLVENT BORNE NON-ISOCYANATE CURABLE TWO-COMPONENTS COATING COMPOSITION

(71) Applicant: Guangdong Huarun Paints Co., Ltd., Foshan (CN)

(72) Inventors: Aihua Zhou, Foshan (CN); Song Niu, Foshan (CN); Shigang Fan, Foshan (CN); Xi Zhao, Foshan (CN)

(73) Assignee: Guangdong Huarun Paints Co., Ltd., Foshan (CN)

( * ) Notice: Subject to any disclaimer, the term of this patent is extended or adjusted under 35 U.S.C. 154(b) by 59 days.

(21) Appl. No.: 16/424,010

(22) Filed: May 28, 2019

(65) Prior Publication Data

US 2019/0359848 A1 Nov. 28, 2019

(51) Int. Cl.
| | |
|---|---|
| *C09D 175/04* | (2006.01) |
| *C08G 18/02* | (2006.01) |
| *C08G 18/36* | (2006.01) |
| *C08G 18/42* | (2006.01) |
| *C08G 18/48* | (2006.01) |

(52) U.S. Cl.
CPC ......... *C09D 175/04* (2013.01); *C08G 18/025* (2013.01); *C08G 18/36* (2013.01); *C08G 18/4263* (2013.01); *C08G 18/4825* (2013.01)

(58) Field of Classification Search
CPC .............................. C09D 175/04; C08G 18/025
See application file for complete search history.

(56) References Cited

U.S. PATENT DOCUMENTS

| | | |
|---|---|---|
| 1,995,036 A | 3/1935 | Pape |
| 4,612,054 A | 9/1986 | Hamon |
| 4,977,219 A | 12/1990 | Watson, Jr. |
| 5,574,083 A | 11/1996 | Brown et al. |
| 2019/0202973 A1* | 7/2019 | Laas ................... C08G 18/227 |

FOREIGN PATENT DOCUMENTS

| | | |
|---|---|---|
| CN | 1055939 C | 8/2000 |
| CN | 101679705 A | 3/2010 |
| CN | 102834189 A | 12/2012 |
| CN | 107428902 A | 12/2017 |
| CN | 107614557 A | 1/2018 |
| JP | 2015168693 A | 9/2015 |
| WO | 2016126606 | 8/2016 |
| WO | 2018029197 | 2/2018 |

OTHER PUBLICATIONS

European Search Report, dated Aug. 12, 2019, Munich, Germany.
W Posthumus et al., "Crosslinking by polycarbodiimides", Progress in Organic Coatings, vol. 58, Issue 2, Dec. 13, 2006, pp. 231-236.

* cited by examiner

*Primary Examiner* — Arrie L Reuther
(74) *Attorney, Agent, or Firm* — Law Offices of Liaoteng Wang

(57) ABSTRACT

The present disclosure is directed to a solvent borne non-isocyanate curable two-components coating composition, comprising: component a) a film-forming resin composition comprising a resin component having carboxyl functional groups and hydroxyl functional groups and having an acid value of at least 23 mg KOH/g resin; and component b) an aromatic polycarbodiimide having two or more —N=C=N— moieties, wherein the carboxyl functional groups of the resin component and the —N=C=N— moieties present in the aromatic polycarbodiimide have a molar ratio in the range of 1:2 to 2:1, preferably in the range of 1:1 to 2:1; and wherein the coating composition comprises less than 1 wt % of water relative to the total weight of the coating composition. The present disclosure is also directed to an article comprising a substrate and a coating disposed thereon formed by the above solvent borne non-isocyanate curable two-components coating composition.

17 Claims, No Drawings

SOLVENT BORNE NON-ISOCYANATE CURABLE TWO-COMPONENTS COATING COMPOSITION

CROSS-REFERENCE TO RELATED APPLICATION

This application is based on and claims priority to Chinese Patent Application No. 201810523040.2 filed on May 28, 2018, which is incorporated herein by reference in its entirety.

TECHNICAL FIELD

The present invention relates to a solvent borne non-isocyanate curable two-components coating composition and an article coated therewith.

BACKGROUND

It is known that polyurethanes and polyureas have good performance, and thus polyurethane and polyurea coating compositions have great market and commercial value. However, in formulating polyurethane or polyurea coating composition, it is common to require large amounts of isocyanate curing agents. During their application processes, some free isocyanate molecules are inevitably released into atmosphere, causing damage to builders' health and atmosphere. Therefore, the coating compositions which are cured with non-isocyanate curing agents are becoming a research hotspot. Currently, polycarbodiimides, oxazolines, amino resins, aldehydes, phenolic resins and the like are well-known non-isocyanate curing agents, of which polycarbodiimide is the most common curing agent.

The reaction mechanism of a carbodiimide functional group (—N=C=N—) of polycarbodiimide with a carboxyl functional group (—COOH) is known, and thus the polycarbodiimide can usually be combined with a resin component having a carboxylic acid group to form a coating composition. For example, U.S. Pat. No. 1990/4,977,219 discloses that a carboxylated latex resin and a neutralized carboxylated water soluble polymer crosslink with an aliphatic or cycloaliphatic polyfunctional polycarbodiimide (PCDI) or a hybrid aliphatic-aromatic polyfunctional polycarbodiimide. U.S. Pat. No. 1996/5,574,083 discloses that an aromatic polycarbodiimide containing only an aromatic carbodiimide group is used as a crosslinking agent for a polymer having a carboxyl group. U.S. Pat. No. 1,995,036 discloses a composition comprising a polymer having a sulfur-containing and/or phosphorus-containing acidic group and an aliphatic polycarbodiimide crosslinker. Moreover, U.S. Pat. No. 5,574,083 discloses a water-based curing system formed by combining an aromatic polycarbodiimide crosslinking agent with a resin component having a carboxyl group. However, these system containing polycarbodiimide disclosed above are all aqueous coating systems, and PCDI has rarely been reported to be applied to a solvent-borne coating system.

It is stated that WO 2016/126606 discloses a solvent borne curing system formed by combining a hybrid resin containing a carbodiimide group with a polymer containing an acid group. However, considering that the reaction system containing polycarbodiimide has a high reactivity, the system usually has a short gel time, thus it is difficult to formulate a solvent-borne coating composition having a balanced drying speed and gel time.

There is still a need in the coatings industry for a solvent borne non-isocyanate, especially polycarbodiimide curable coating composition with a balanced curing speed and spot life.

SUMMARY OF THE INVENTION

In one aspect, the present invention provides a solvent borne non-isocyanate curable coating composition having a balanced cure speed and pot life. Specifically, the solvent borne non-isocyanate curable two-component coating composition according to the present invention comprises: component a) a film-forming resin composition comprising a resin component having carboxyl functional groups and hydroxyl functional groups and having an acid value of at least 23 mg KOH/g resin; and component b) an aromatic polycarbodiimide having two or more —N=C=N— moieties, wherein the carboxyl functional groups of the resin component and the —N=C=N— moieties present in the aromatic polycarbodiimide have a molar ratio in the range of 1:2 to 2:1, preferably in the range of 1:1 to 2:1; and wherein the coating composition comprises less than 1 wt % of water relative to the total weight of the coating composition.

In the solvent borne non-isocyanate curable coating composition according to the present invention, the resin component contained in the film-forming resin composition may have a hydroxyl value of 40 mg KOH/g or more. Preferably, the resin component has an acid value of 40 to 130 mg KOH/g resin and a hydroxyl value of 40-120 mg KOH/g resin.

In the solvent borne non-isocyanate curable coating composition according to the present invention, the film-forming resin composition may further comprise an organic solvent containing a monofunctional alcohol.

In another aspect, the present invention provides an article comprising a substrate and a coating disposed thereon formed by the solvent borne non-isocyanate curable two-components coating composition according to the present invention. Preferably, the substrate comprises a wooden substrate, a plastic substrate, a metal substrate or the combination thereof.

The present inventors have surprisingly found that in a solvent borne non-isocyanate curable two-component coating composition, the film-forming resin composition contains a resin component having carboxyl functional groups and hydroxyl functional groups both, and the molar ratio of the carboxyl groups of the resin component and the —N=C=N— moiety of the aromatic polycarbodiimide as a curing agent is controlled in the range of 2:1 to 1:2, so that a solvent borne non-isocyanate curable coating composition having a balanced pot life and curing speed can be obtained and the coating thus formed also has a particularly high hardness.

The present inventors have also surprisingly found that in a solvent borne non-isocyanate curable two-component coating composition, the film-forming resin composition comprising a monofunctional alcohol such as isopropyl alcohol as an organic solvent may result in the coating composition having an extended pot life while keeping the cure speed unchanged, which is considered as an additional benefit of the present invention.

The details of one or more embodiments of the invention will be set forth in description below. The other features, objectives, and advantages of the invention will become apparent.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the context of the present invention, the term "aromatic polycarbodiimide" refers to a compound having two or more —N=C=N— moieties in its molecular skeleton, and at least one end of the —N=C=N— moiety is attached to an aromatic group in which the aromatic group is selected from the group consisting of substituted or unsubstituted aryl group, substituted or unsubstituted arylene group, or a combination thereof. Optionally, the substituent preferably includes $C_{1-18}$ alkyl, $C_{1-18}$ alkoxy, $C_{2-18}$ alkenyl, $C_{2-18}$ alkenyloxy, or combinations thereof. In one embodiment of the present invention, examples of suitable aromatic groups comprise phenylene group or phenylene group substituted with a methyl group.

In the context of the present invention, the term "monofunctional alcohol" means an alcohol having one hydroxyl functional group, including but not limited to methanol, ethanol, n-propanol, isopropanol, n-butanol, pentanol, neopentyl alcohol, n-hexanol or a combination thereof.

In the context of the present invention, when used in a solvent borne non-isocyanate curable two-component coating composition, "drying time" is a performance parameter for measuring the curing speed of the coating composition, which means the time for which the coating reaches to be tack free after all components of the coating composition are mixed together followed by being coated with a thickness of 120 μm on tinplate to form a coating.

In the context of the present invention, when used in a solvent borne non-isocyanate curable two-component coating composition, "gel time" is a performance parameter for measuring the pot life of the coating composition, which means the time it takes for the resulting mixture to reach twice its initial viscosity at room temperature after all component of the coating composition are mixed together.

In the context of the present invention, the term "room temperature" refers to a temperature that is measured under laboratory conditions, usually in the range of 20-25° C.

When used in a solvent borne non-isocyanate curable two-component coating composition, the term "substantially free of water" means that the solvent borne coating composition of the present invention comprises less than 1000 parts per million (ppm) of water; the term "essentially free of water" means that the solvent borne coating composition of the present invention comprises less than 100 parts per million (ppm) of water; the term "essentially completely free of water" means that the solvent borne coating composition of the present invention comprises less than 5 parts per million (ppm) of water; and the term "completely free of water" means that the solvent borne coating composition of the present invention comprises less than 20 parts per billion (ppb) water.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

The present invention provides a solvent borne non-isocyanate curable coating composition, comprising:

component a) a film-forming resin composition comprising a resin component having carboxyl functional groups and hydroxyl functional groups and having an acid value of at least 23 mg KOH/g resin; and component b) an aromatic polycarbodiimide having two or more —N=C=N— moieties, wherein the carboxyl functional groups of the resin component and the —N=C=N— moieties present in the aromatic polycarbodiimide have a molar ratio in the range of 1:2 to 2:1, preferably in the range of 1:1 to 2:1; and wherein the coating composition comprises less than 1 wt % of water relative to the total weight of the coating composition.

According to the present invention, the non-isocyanate curable two-component coating composition is solvent borne. The solvent borne two-component coating composition comprises less than 1% by weight of water, based on the total weight of the solvent borne coating composition. Preferably, in one embodiment according to the present invention, the solvent-borne coating composition is substantially free of water, preferably essentially free of water, and more preferably substantially essentially free of water and the most preferably completely free of water, relative to the total weight of the solvent borne coating composition.

It is well known that a solvent borne coating composition is significantly different from an aqueous coating composition in nature, especially its curing performance. Aqueous medium contained in the aqueous coating composition has a lower volatilization speed, and thus the aqueous coating composition generally does not have the technical problems of solvent-based coating composition, for example the technical problem that the system has a short gel time due to excessive drying speed and thus it is difficult to be operated during application. In a solvent borne coating composition, particularly those containing polycarbodiimide as a curing agent, both high volatility of organic solvent medium and high reactivity of polycarbodiimide as curing agent cause the result that gel time of the system is greatly shortened, so it is often difficult to formulate a solvent-borne polycarbodiimide curable coating composition with a suitable application time. However, the solvent-borne non-isocyanate curable two-component coating composition according to the present invention overcomes the above technical problems and has a balanced pot life and drying speed.

In the solvent borne non-isocyanate curable two-component coating composition according to the present invention, as the main component of film-forming resin composition, the resin component has an acid value of at least 23 mg KOH/g resin. It is preferred that the resin component has a higher acid value, such as of 40 mg KOH/g resin or higher, more preferably of 50 mg KOH/g resin or higher, still more preferably of 80 mg KOH/g resin or higher, even more preferably of 100 mg KOH/g resin or higher. However, if the acid value is too high, it generally results in too fast drying, and the system gels quickly, which is detrimental to the actual operation. Thus, the preferred acid value can range for example, from 40 to 130 mg KOH/g resin. The acid value is determined according to titration skills known to those of ordinary skill in the art.

As the main component of film-forming resin composition, the resin component contains hydroxyl functional groups in addition to the carboxyl functional groups, and the presence of the hydroxyl functional groups is an important factor in causing the coating composition to achieve a balanced pot life and drying speed.

It is well known that in a coating system curable with polycarbodiimide, after mixing both the resin component with carboxyl functional groups and polycarbodiimide, the reaction route comprises a) forming an N-acyl urea and b) forming a urea and an anhydride.

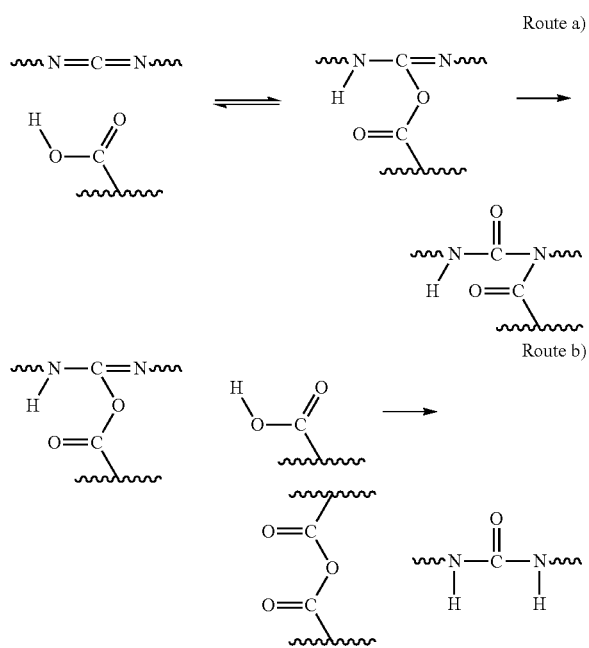

Without bound by any theory, the inventor believes that the presence of hydroxyl groups in the resin component promotes above route b) in which anhydride formed in route b) may react with hydroxyl groups to form an ester, thus allowing the coating system to achieve a suitable balance of curing speed and pot life.

Preferably, the resin component has a hydroxyl value of at least 40 mg KOH/g resin or higher. It is preferred that the resin component has a higher hydroxyl value to significantly extend the gel time of coating system. For example, the resin component may have a hydroxyl value of 50 mg KOH/g resin or higher, more preferably 80 mg KOH/g resin or higher, still more preferably 100 mg KOH/g resin or higher. However, if the hydroxyl value is too high, it can affect the mechanical properties of the coating, such as coating hardness. Thus, the preferred hydroxyl value can range, for example, from 40 to 120 mg KOH per gram of resin. The above hydroxyl value is determined according to the standard GB/T 12008.3-2009.

In an embodiment of the present invention, the resin component has an acid value of 40-130 mg KOH/g resin and a hydroxyl value of 40-120 mg KOH/g resin. In one embodiment of the present invention, the film-forming resin has an acid value of 40-80 mg KOH/g resin and a hydroxyl value of 80-120 mg KOH/g resin. In another embodiment of the present invention, the resin component has an acid value of 100-130 mg KOH/g resin and a hydroxyl value of 50-80 mg KOH/g resin.

According to the present invention, in the film-forming composition, the resin component is selected from a polyester resin, an acrylics resin, a polyurethane resin, a di or trimer fatty acid, an alkyd, a polyether resin or any combination thereof.

According to the present invention, the alkyd resin is an alkyd resin prepared by condensation of polyols, polyacids, mono-functional acids, and fatty acids, fatty acid esters or natural occurring oils. Preferably, the alkyd resin may have a weight average molecular weight in the range of 2,000 to 10,000 g/mol, preferably 3,500 to 9,000 g/mol, more preferably 4,500 to 8,000 g/mol. The weight average molecular weight may be determined by GPC.

In the present invention, the alkyd resin may be formed from any suitable reactants by any suitable preparation process. In an embodiment of the present invention, the alkyd resin may be a reaction product of (a) 20 to 60 wt % of polyols; (b) 20 to 60 wt % of polyacids; (c) 0.1 to 50 wt % of fatty acids, fatty acid esters or occurring oils; and (d) 0 to 15% of monofunctional acids, optionally in the presence of a catalyst and in the presence of a solvent wherein the wt % is relative to the total weight of components of (a), (b), (c), and (d). The suitable reaction conditions for obtaining the alkyd resin may be determined empirically by those skilled in the art, for example at a temperature in the range of 160-250° C. Preferably, the molar ratio of the hydroxyl groups to the carboxyl groups (OH:COOH) of the reactants is in the range of 1:2 to 2:1, which molar ratio may be adjusted depending on the desired hydroxyl value and acid value.

Alcohols for synthesis of an alkyd resin comprise polyols. As an example, the polyols comprises diols, triols, tetraols, oligomer or polymer with two or more hydroxyl groups or any combination thereof. In an embodiment of the present invention, examples of polyols comprise, ethylene glycol, diethylene glycol, triethylene glycol, polyethylene glycol, propylene glycol, dipropylene glycol, polypropylene glycol, pentanediol, pentaerythritol, trimethyol propane, trimethyol ethane, propanetriol, dipentaerythritol, polyesters having one or more, preferably two or more hydroxyl groups, polyacrylates having one or more, preferably two or more hydroxyl groups, polyurethanes having one or more, preferably two or more hydroxyl groups, epoxy resin having one or more, preferably two or more hydroxyl groups or other polyols known in the art for synthesis of an alkyd resin.

Polyacids for synthesis of an alkyd resin comprise diacid or its anhydride, such as phthalic acid and its anhydride, isophthalic acid, terephthalic acid, succinic acid, adipic acid, suberic acid, azelaic acid, sebacic acid, tetrachlorophthalic acid, tetrabromophthalic acid, maleic acid, fumaric acid, mesaconic acid, citraconic acid, dichloromaleic acid; triacids and its anhydride, such as trimellitic acid and its anhydride; tetraacid and its anhydride, such as pyromellitic dianhydride or any combination thereof, or other polyacids or anhydrides known in the art for synthesis of an alkyd resin.

The fatty acid, fatty ester, or naturally occurring, partially-saponified oil may be any fatty acid, fatty ester, or naturally occurring, partially-saponified oil known in the art used for synthesis of an alkyd resin. In a preferred embodiment, the fatty acid, fatty ester, or naturally occurring oil is selected from the formulae (1), (2), (3):

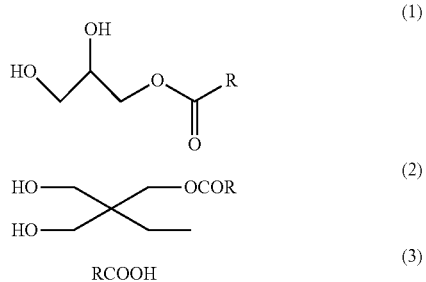

in which, R independently represent a saturated or unsaturated $C_8$-$C_{22}$ alkyl group.

Typical fatty acid comprises dehydrated castor fatty acid, linseed fatty acid, castor fatty acid, soy fatty acid, oleic acid or the combination thereof. Typical fatty oil comprises plant oils, such as canola oil, castor oil, dehydrated castor oil, coconut oil, corn oil, cottonseed oil, peanut oil, linseed oil, ricinene oil, safflower oil, soy bean oil, sunflower oil, tall oil, tung oil, walnut oil, wood oil and the like; animal fat, such as fish oil, lard oil, chicken oil, tallow oil and the like; or the combination thereof.

Optionally, mono-functional acids may also be used for synthesis of an alkyd resin. Typical mono-functional acid is selected from benzoic acid, acetic acid, propionic acid, t-butyl benzoic acid and any combination thereof.

Optionally, synthesis of an alkyd resin may be carried out in the presence of a catalyst and a solvent. A catalyst may be used to promote the formation of an alkyd resin. The catalyst may be any catalyst known in the art used for synthesis of an alkyd resin. Preferably, the catalyst is an acid catalyst, such as, for example, FASCAT 4100. The amount of catalyst added may be determined by routine experimentation as understood by those skilled in the art. A solvent may be used to dilute a reaction mixture. The solvent may be any solvent known in the art used for synthesis of an alkyd resin.

In a specific embodiment of the present disclosure, an alkyd resin is synthesized which has a hydroxyl value of about 40 to 120 mg KOH/g resin, an acid value of 40-130 mg KOH/g resin and a solid content of 50-65%.

In some embodiments of the solvent borne non-isocyanate curable two-component coating composition according to the present invention, the film-forming resin composition further contains an organic solvent containing a monofunctional alcohol.

In the context of the present invention, a monofunctional alcohol refers to an alcohol having one hydroxyl functional group including, but not limited to, methanol, ethanol, n-propanol, isopropanol, n-butanol, pentanol, neopentyl alcohol, n-hexanol or a combination thereof. In one embodiment of the invention, the monofunctional alcohol is isopropanol.

According to the present invention, the organic solvent in the film-forming resin composition further includes other organic solvents selected from the group consisting of aromatic hydrocarbons, ketones, $C_1$-$C_6$ alkyl (meth)acrylates, glycol ether esters, or a combination thereof. Preferably, the weight ratio of the monofunctional alcohol to the sum of the other organic solvents is in the range of 2:1 to 1:2.

The inventors of the present invention have surprisingly found that a monofunctional alcohol such as isopropanol contained in the film-forming resin composition can result in the coating composition having a longer pot life, i.e., gel time, without adversely affecting its curing speed.

In a preferred embodiment of the present invention, the film-forming resin composition comprises, based on the total weight of the film-forming resin composition, 55 to 85% by weight of the resin component; 15 to 30% by weight % monofunctional alcohol; and 0-15% by weight of other organic solvents.

According to the present invention, the film-forming resin composition may further comprise one or more conventional additives for the solvent borne coating composition that do not adversely affect the coating composition or coating obtained therefrom. Suitable additives include, for example, those that can be used to improve the processability or manufacturability of the composition, enhance composition aesthetics, or improve a particular functional property or characteristic of the coating composition or the cured composition resulting therefrom, such as adhesion to a substrate. Suitable examples of the additive include coalescents, co-solvents, pigments, anti-migration aids, anti-microbials, chain-extenders, biocides, plasticizers, defoamers, colorants, waxes, anti-oxidants, anti-corrosion agent, flow control agent, thixotropic agent, adhesion promoters, UV stabilizers, or combinations thereof. Each optional ingredient can be included in a sufficient amount to serve its intended purpose, but preferably not in such an amount to adversely affect the coating composition or cured coating obtained therefrom.

According to some embodiments of the present invention, the total amount of the additional additives is in the range of from about 0 to 40% by weight, preferably in the range of 0.1 to about 15% by weight relative to the total weight of the film-forming resin composition.

According to some embodiments of the invention, the solvent borne non-isocyanate curable two-component coating composition comprises an aromatic polycarbodiimide having two or more —N=C=N— moieties as an curing agent component b).

In the curing agent, the —N=C=N— moiety contained in polycarbodiimide acts as a functional moiety capable of reacting with carboxyl group of resin component, at least one end of which is bonded to aromatic group. Polycarbodiimide having such a structure has a suitable reactivity and thus is more suitable to formulate a solvent borne coating composition, compared with an aliphatic polycarbodiimide one end of which its —N=C=N— moiety is bonded to aliphatic group. According to the present invention, aromatic polycarbodiimides are commercially available, for example, Lupranate 5500XL, commercially available from BASF.

In the solvent borne non-isocyanate curable two-component coating composition of the present invention, the ratio of a resin component providing carboxyl functional groups in component a) and an aromatic polycarbodiimide providing a —N=C=N— moiety in component b) is important. As disclosed by W. Possthumus et al. in 'Crosslinking by polycarbodiimides', Progress in Organic Coatings 58 (2007) 231-236, the molar ratio of the carboxyl functional groups of the resin component with respect to the N=C=N moieties of the polycarbodiimide also affect the ratio between the anhydride/urea route (route a) and the N-acyl urea route (route b) and the portion of formed N-acyl urea increased with the carbodiimide concentration. As firstly proposed by the present inventor, the anhydride/urea route (route b) is advantageous to extend the gel time of the coating system. Based on above finding, therefore, the carboxyl functional groups of the resin component and the —N=C=N— moieties present in the aromatic polycarbodiimide preferably has a molar ratio in the range of 1:2 to 2:1, more preferably in the range of 1:1 to 2:1.

Therefore, the solvent borne non-isocyanate curable two-component coating composition has a balance of pot life and drying speed.

In an embodiment of the present invention, after all components of the coating composition according to the present invention are mixed together followed by being coated on tinplate to form a coating with a thickness of 120 µm, the coating has a drying time of no greater than 10 minutes, preferably no greater than 9 minutes, more preferably no greater than 8 minutes, still more preferably no greater than 7 minutes at room temperature.

In an embodiment of the present invention, after all components of the coating composition according to the present invention are mixed together, the coating composition has a gel time for 15 minutes or more, preferably 20 minutes or more, more preferably 25 minutes or more, still more preferably 30 minutes or more at room temperature.

In an embodiment of the present invention, after all components of the coating composition are mixed together followed by being coated on tinplate to form a coating with a thickness of 120 µm, the coating has a drying time of no greater than 10 minutes, preferably no greater than 9 minutes, more preferably no greater than 8 minutes, still more preferably no greater than 7 minutes at room temperature; and after all components of the coating composition are mixed together, the coating composition has a gel time of 15 minutes or more, preferably 20 minutes or more, more preferably 25 minutes or more, still more preferably 30 minutes or more at room temperature.

According to the present invention, the solvent-borne non-isocyanate curable two-component coating composition can be prepared by simply mixing the film-forming resin composition with the aromatic polyisocyanate curing agent in a mixing device at a predetermined weight ratio before application. The resulting solvent-borne coating composition can be applied in a variety of ways that are familiar to those skilled in the art, including spraying (e.g., air assisted, airless or electrostatic spraying), brushing, rolling, flooding and dipping. In an embodiment of the present invention, the resulting coating composition is coated by spraying. The coating composition can be applied in various wet film thickness. In an embodiment of the present disclosure, the coating composition is applied in such a wet film thickness that the formed coating has a dry thickness preferably from about 13 to about 260 µm (about 0.5 to about 10 mils) and more preferably from about 25 to about 75 µm (about 1 to about 3 mils). The applied coating composition may be cured by air drying or by accelerating drying with various drying devices (e.g., ovens) that are familiar to those skilled in the art.

Therefore, the present invention in another aspect provides an article comprising a substrate and a coating disposed thereon formed by the solvent borne non-isocyanate two-components coating composition according to the present invention. Preferably, the substrate comprises a wooden substrate, a plastic substrate or a metal substrate.

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

EXAMPLES

Test Methods

Pendulum Hardness

The pendulum hardness is used to measure curing performances of cured system, especially the surface curing performance. The measurement was carried out in accordance with GB/T 1730-2007.

Pencil Hardness

This test is used to measure hardness of cured coating. Pencil hardness was evaluated using ASTM D3363. The data was reported as the pencil hardness of the last successful test before the coating broke. Thus, for example, if the coating is not broken when tested with a 2H pencil, but cracked when tested with a 3H pencil, the coating is reported to have a pencil hardness of 2H.

Gloss

This test is used to measure gloss of cured coating. The Sheen orifice glossmeter was used to evaluate 60° gloss according to ASTM D523.

Materials

Materials used for various examples are listed in the following Table 1.

TABLE 1

| Item | Materials | Supplier |
|---|---|---|
| 1 | Oleic acid (OA) | Jiangmen Jiali Oil Co., Ltd., China |
| 2 | Phthalic anhydride (PA) | Zhongshan Unicizers Industrial Co., Ltd., China |
| 3 | Adipic acid (AA) | Liaoyang Petrochemical company, China |
| 4 | Trimethylolpropane (TMP) | Jilin Chemical Group Company, China |
| 5 | Xylene | SINOPEC Maoming Company, China |
| 6 | Trimellitic anhydride (TMA) | Baichuan Chemical Co., Ltd. Ru Gao, China |
| 7 | n-butyl acetate (n-BA) | Jiangmen Handsome Chemical Development Ltd. China |
| 8 | Polyether polyol (N310) with a hydroxyl value of 120 mg/g | Zhongshan Unicizers Industrial Co., Ltd., China |
| 9 | Acrylics resin with an acid value of 120 mg/g | As prepared conventionally |
| 10 | Aromatic polycarbodiimide (Lupranate 5500XL) | BASF |

Example 1: Synthesis of Alkyds

Synthesis Example 1: Alkyd-1 Having High Acid Value and High Hydroxyl Value

At room temperature, items 1-5 of raw materials in Table 1 were carefully added into a four-neck flask equipped with a thermometer, an overhead stirrer, a $N_2$ gas inlet, and a reflux apparatus. Then $N_2$ gas was bubbled into the mixture for about 10 min. Afterwards, the mixture was heated to 170° C. and kept for reflux at 170-220° C. till acid value on solid resin is around 7 mgKOH/g. The reaction system was cooled down to 180° C. and item 6 of Table 1 was charged carefully, then the temperature was kept at 180° C. till acid value on solid resin is around 57.1 mgKOH/g. Thereafter the reaction temperature was cooled down to around 130° C., and was blended with item 7 of Table 1. Finally, the alkyd resin solution with 62.1% solid content was obtained, and the calculated hydroxyl value is around 109.2 mg KOH/g.

Synthesis Example 2: Alkyd-2 Having High Acid Value and High Hydroxyl Value

The detailed synthesis process was almost the same as that of synthesis example 1. Finally, the alkyd resin solution with 58.9% solid content was obtained. The calculated acid value of the solid resin was 87.6 mgKOH/g, and the calculated hydroxyl value was around 85.9 mg KOH/g.

Synthesis Example 3: Alkyd-3 Having High Acid Value and High Hydroxyl Value

The detailed synthesis process was almost the same as that of synthesis example 1. Finally, the alkyd resin solution with 60.3% solid content was obtained. The calculated acid value of the solid resin was 72.3 mg KOH/g, and the calculated hydroxyl value was around 105.5 mg KOH/g.

Synthesis Example 4: Alkyd-4 Having High Acid Value and High Hydroxyl Value

The detailed synthesis process was almost the same as that of synthesis example 1. Finally, the alkyd resin solution with 61.6% solid content was obtained. The calculated acid value of the solid resin was 55.7 mgKOH/g, and the calculated hydroxyl value was around 127.3 mgKOH/g.

The compositions of alkyd resins 1-4 and their properties were listed in the following Table 2.

TABLE 2

| Item | Materials | Alkyd-1 | Alkyd-2 | Alkyd-3 | Alkyd-4 |
|---|---|---|---|---|---|
| 1 | OA/g | 125.32 | 118.31 | 114.19 | 109.15 |
| 2 | PA/g | 202.21 | 190.89 | 184.24 | 176.10 |
| 3 | AA/g | 17.08 | 16.13 | 15.57 | 14.88 |
| 4 | TMP/g | 213.03 | 201.11 | 194.10 | 185.53 |
| 5 | Xylene/g | 16.73 | 15.79 | 15.24 | 14.57 |
| 6 | TMA/g | 56.59 | 87.01 | 104.88 | 126.74 |
| 7 | n-BA/g | 369.03 | 370.76 | 371.78 | 373.03 |
| | Properties of alkyd resin | | | | |
| 1 | Acid value on solid (mg KOH/g) | 57.1 | 87.6 | 105.5 | 127.3 |
| 2 | Acid value on resin solution (mg KOH/g) | 35.5 | 51.6 | 63.6 | 78.3 |
| 3 | OH value on solid (mg KOH/g) | 109.2 | 85.9 | 72.3 | 55.7 |
| 4 | Solid content (%) | 62.1 | 58.9 | 60.3 | 61.6 |
| 6 | Storage stability (60° C.*6 d) | Ok | Ok | Ok | Ok |

Example 2: Preparation of Solvent Borne Two Component Coating Composition

Prior to use, the alkyd resins 1-4 prepared above were separately mixed with the components shown in Table 3 below to form Formulations 1-4. And then, the Formulations 1-4 were applied to the tin plates using a 120 micron applicator, followed by drying at room temperature to form coatings 1-4. The gel time of the resulting formulation and the drying time, pendulum hardness and pencil hardness of the respective coatings were then determined using the method indicated in the test section. The results are summarized in Table 3 below.

TABLE 3

| Ingredients | | Formula-1 | Formula-2 | Formula-3 | Formula-4 |
|---|---|---|---|---|---|
| Alkyd-1 | | 9.60 | | | |
| Alkyd-2 | | | 8.91 | | |
| Alkyd-3 | | | | 8.14 | |
| Alkyd-4 | | | | | 7.38 |
| Solvent (Butyl Acetate:Isopropanol = 1:1) | | 7.40 | 7.04 | 7.31 | 7.54 |
| PCDI | | 3.00 | 4.05 | 4.56 | 5.08 |
| Total | | 20.00 | 20.00 | 20.00 | 20.00 |
| Solid in Formula (%) | | 40 | 40 | 40 | 40 |
| Gel time (min) | | 124 | 61 | 32 | 25 |
| Coating performances | | | | | |
| Drying time | | 8 | 7 | 7 | 4 |
| Pendulum Hardness (sec) | 1 d | 143 | 154 | 188 | 191 |
| | 2 d | 141 | 158 | 187 | 198 |
| | 5 d | 140 | 158 | 187 | 195 |
| | 6 d | 140 | 164 | 196 | 201 |
| | 7 d | 140 | 164 | 196 | 201 |
| Pencil Hardness | 1 d | HB | HB | H | H |
| | 2 d | HB | H | H | H |
| | 5 d | HB+ | H | H+ | H+ |
| | 6 d | HB+ | H | H+ | H+ |
| | 7 d | HB+ | H | H+ | H+ |

From the above results, it can be seen that the solvent borne non-isocyanate curable coating composition of the present invention has a balance of gel time and a drying speed, and the resulting coating has a high hardness.

Example 3: Effect of Monofunctional Alcohol on Crosslinking System

In order to verify the effect of monofunctional alcohols in the organic solvent on the crosslinking system, a mixture of n-butyl acetate and isopropyl alcohol (1:1 by volume) and n-butyl acetate alone were used as organic solvents to prepare a coating composition of alkyd resin that is curable with PCDI. After that, the gel time of the composition was measured at room temperature and the drying time of the resulting coating were measured. The results are shown in Table 4 below.

TABLE 4

| Ingredients | Formula-3 | Formula-3* |
|---|---|---|
| Alkyd | 8.14 | 8.14 |
| Solvent | 7.31 (Butyl Acetate:Isopropanol = 1:1) | 7.31 (Butyl Acetate) |
| PCDI | 4.56 | 4.56 |
| Total | 20 | 20 |
| Solid in Formula (%) | 40 | 40 |
| Acid value on solid (mg KOH/g) | 105.5 | 105.5 |
| Gel time (min) | 32 | 16 |
| Drying time | 7 | 7 |
| Coating performances | | |

TABLE 4-continued

| Ingredients | | Formula-3 | Formula-3* |
|---|---|---|---|
| Pendulum | 1 d | 188 | 189 |
| Hardness | 2 d | 187 | 188 |
| (sec) | 5 d | 187 | 186 |
| | 6 d | 196 | 187 |
| | 7 d | 196 | 188 |
| Pencil | 1 d | H | 195 |
| Hardness | 2 d | H | 196 |
| | 5 d | H+ | H |
| | 6 d | H+ | H |
| | 7 d | H+ | H |

Example 4: Effect of Hydroxyl Group on Crosslinking System

In order to verify the effect of hydroxyl groups on the crosslinking system, a polyether polyol having a hydroxyl value of 120 mg/g, an acrylics resin having an acid value of 120 mg/g, and a combination of the two were mixed with polycarbodiimide in the amount as shown in Table 5. The coating formed from these mixture were measured for its pencil hardness, adhesion, stain resistance, and gloss. The results are shown in Table 5 below.

TABLE 5

| Ingredients | Formula A | Formula B | Formula C |
|---|---|---|---|
| Polyether polyol/wt % | 30 | 0 | 22 |
| Acrylics/wt % | 0 | 35 | 23 |
| PCDI/wt % | 35 | 30 | 20 |
| Butyl acetate/wt % | 35 | 35 | 35 |
| Coating performances | | | |
| Pencil hardness | Not curing | H | H |
| adhesion | — | 5B | 5B |
| gloss(60°) | — | 95 | 85 |

From the above results, it can be seen that the polyol itself cannot be crosslinked and cured with PCDI. The coating obtained from Formula C had the same coating properties as the coating obtained from Formula B, but with decreased gloss, indicating that the polyether polyol in Formula C was involved in the crosslinking reaction.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A solvent borne non-isocyanate two-components coating composition, comprising:
   component a) a film-forming resin composition comprising a resin component having carboxyl functional groups and hydroxyl functional groups; and
   component b) an aromatic polycarbodiimide having two or more —N=C=N— moieties,
   wherein the carboxyl functional groups of the resin component and the —N=C=N— moieties present in the aromatic polycarbodiimide have a molar ratio in the range of 1:2 to 2:1; and
   wherein the coating composition comprises less than 1 wt % of water relative to the total weight of the coating composition; and
   wherein the resin component has a hydroxyl value of 40 mg KOH/g resin or more; and
   wherein the resin component has an acid value ranging from 40 to 130 mg KOH/g resin.

2. The coating composition according to claim 1, wherein the resin component has a hydroxyl value ranging from 40 to 120 mg KOH/g resin.

3. The coating composition according to claim 1, wherein the resin component comprises one of more selected from a polyester resin, an acrylics resin, a polyurethane resin, a di or trimer fatty acid, an alkyd, and a polyether resin.

4. The coating composition according to claim 3, wherein the resin component comprises an alkyd.

5. The coating composition according to claim 4, wherein the alkyd comprises monomer components comprising a) 20-60 wt % of a polyol, b) 20-60 wt % of a polyacid or its anhydride; c) 0.1-50 wt % of a fatty acid, fatty ester or naturally occurred oils; and d) 0-15 wt % of a monofunctional acid,
   wherein the wt % is relative to the total weight of the components a), b), c) and d); and
   wherein the hydroxyl functional groups of the polyol and the sum of the carboxyl functional groups present in the polyacids or its anhydride, the fatty acid, fatty ester or naturally occurred oils and the nonfunctional acid have a molar ratio in the range of 1:2 to 2:1.

6. The coating composition according to claim 1, wherein the film-forming resin composition further comprises an organic solvent comprising a monofunctional alcohol.

7. The coating composition according to claim 6, wherein the monofunctional alcohol is selected from methanol, ethanol, n-propanol, i-propanol, n-butanol, pentanol, neopentyl alcohol, n-hexanol or any combination thereof.

8. The coating composition according to claim 7, wherein the monofunctional alcohol is i-propanol.

9. The coating composition according to claim 6, wherein the organic solvent further comprises other organic solvents selected from the group consisting of aromatic hydrocarbons, C1-C6 alkyl (meth)acrylates, diglycol ether esters and any combination thereof.

10. The coating composition according to claim 9, wherein the weight ratio of the monofunctional alcohol to the sum of the other organic solvents is in the range of 1:2 to 2:1.

11. The coating composition according to claim 9, wherein the film-forming resin composition comprises, relative to the total weight of the film-forming resin composition,
   55-85 wt % of the resin component;
   15-30 wt % of the monofunctional alcohol; and
   0-15 wt % of the other organic solvents.

12. The coating composition according to claim 1, wherein after all components of the coating composition are mixed together followed by being coated on tinplate to form a coating with a thickness of 120 μm, the coating has a drying time of no greater than 10 minutes at room temperature.

13. The coating composition according to claim 1, wherein after all components of the coating composition are mixed together, the coating composition has a gel time of 15 minutes or more at room temperature.

14. The coating composition according to claim 1, wherein after all components of the coating composition are mixed together followed by being coated on tinplate to form a coating with a thickness of 120 μm, the coating has a drying time of no greater than 10 minutes at room temperature; and after all components of the coating composition are mixed together, the coating composition has a gel time of 15 minutes or more at room temperature.

15. An article comprising a substrate and a coating disposed thereon formed by the solvent borne non-isocyanate two-components coating composition according to claim 1.

16. The article according to claim 15, wherein the substrate comprises a wooden substrate, a plastic substrate or a metal substrate.

17. The coating composition according to claim 1, wherein the carboxyl functional groups of the resin component and the —N═C═N— moieties present in the aromatic polycarbodiimide have a molar ratio in the range of 1:1 to 2:1.

* * * * *